Oct. 23, 1928.
A. R. WILLARD
1,688,369
AUTOMATIC FEED MECHANISM
Filed March 26, 1926
4 Sheets-Sheet 1
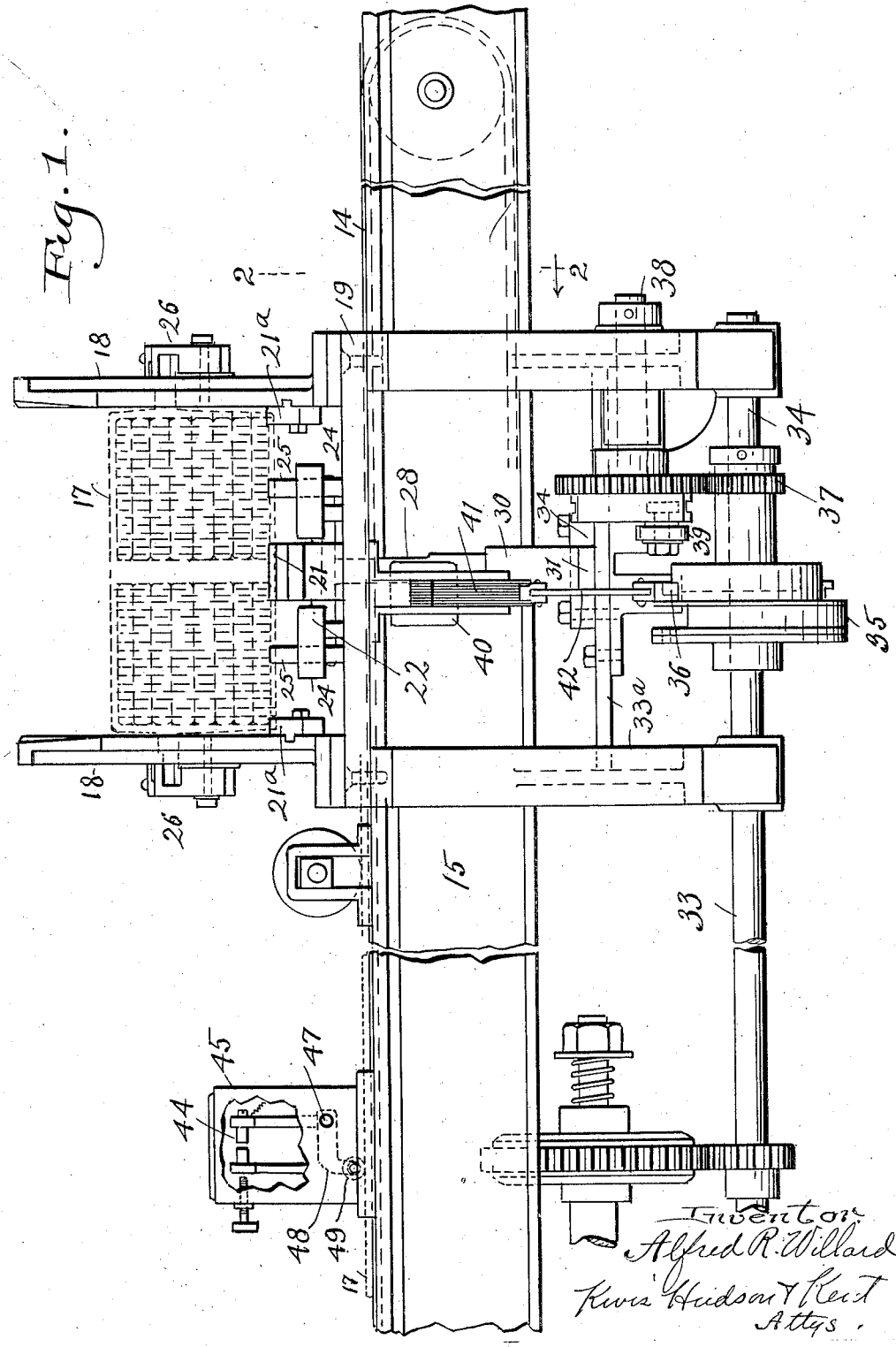

Oct. 23, 1928.
A. R. WILLARD
AUTOMATIC FEED MECHANISM
Filed March 26, 1926    4 Sheets-Sheet 2
1,688,369
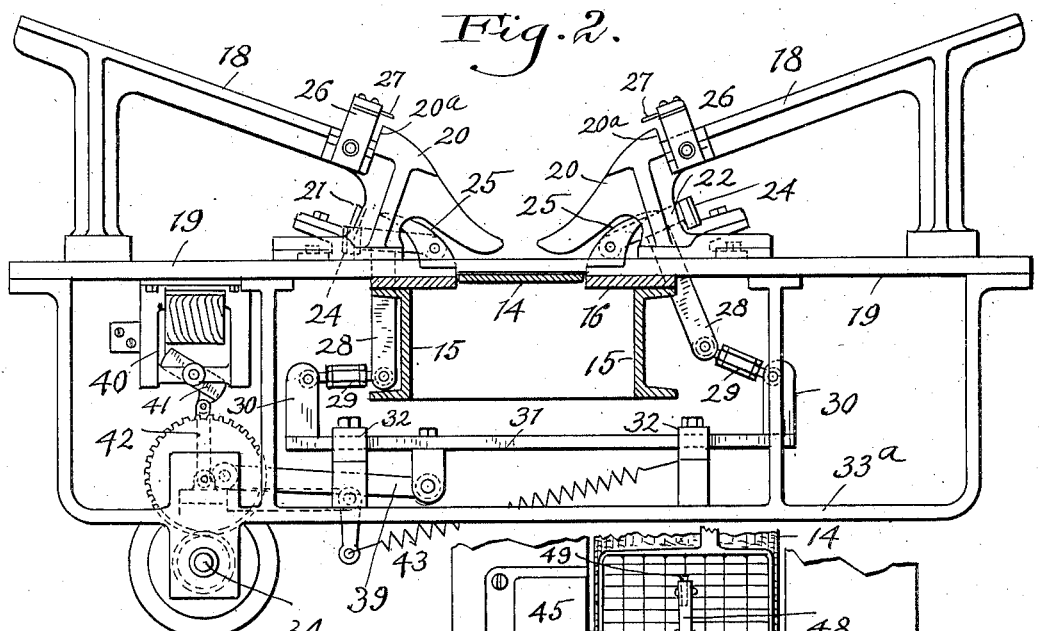
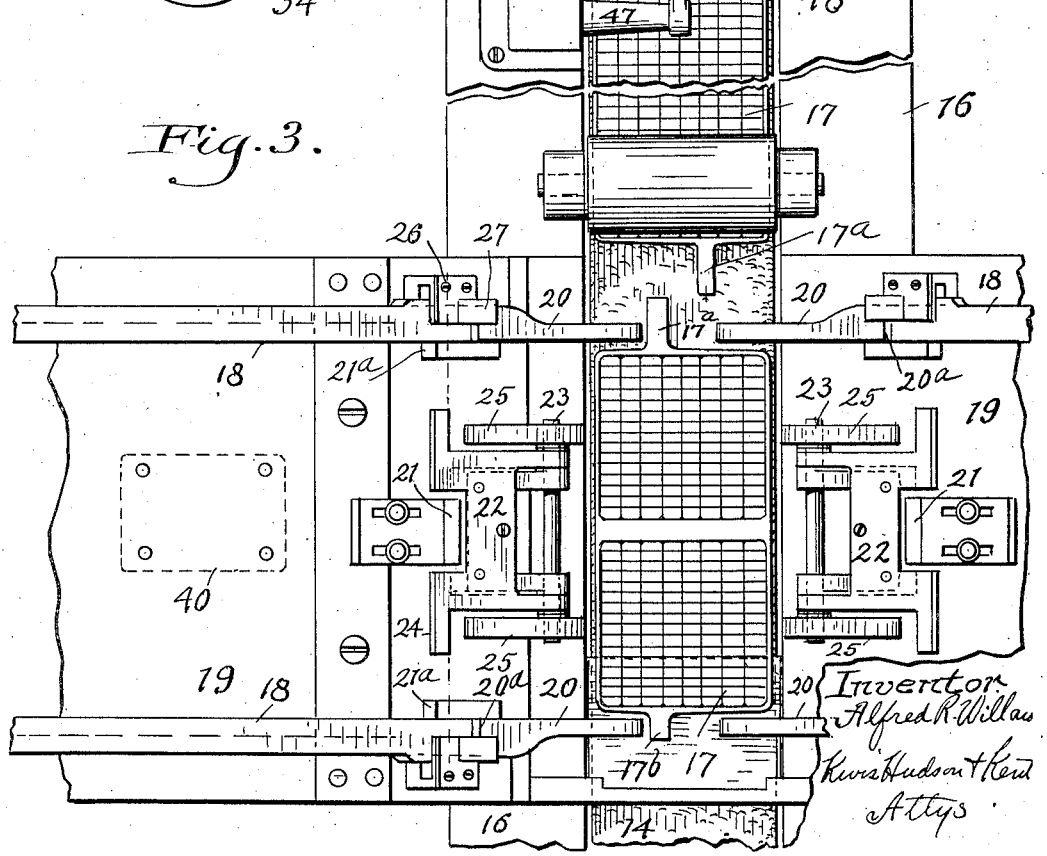

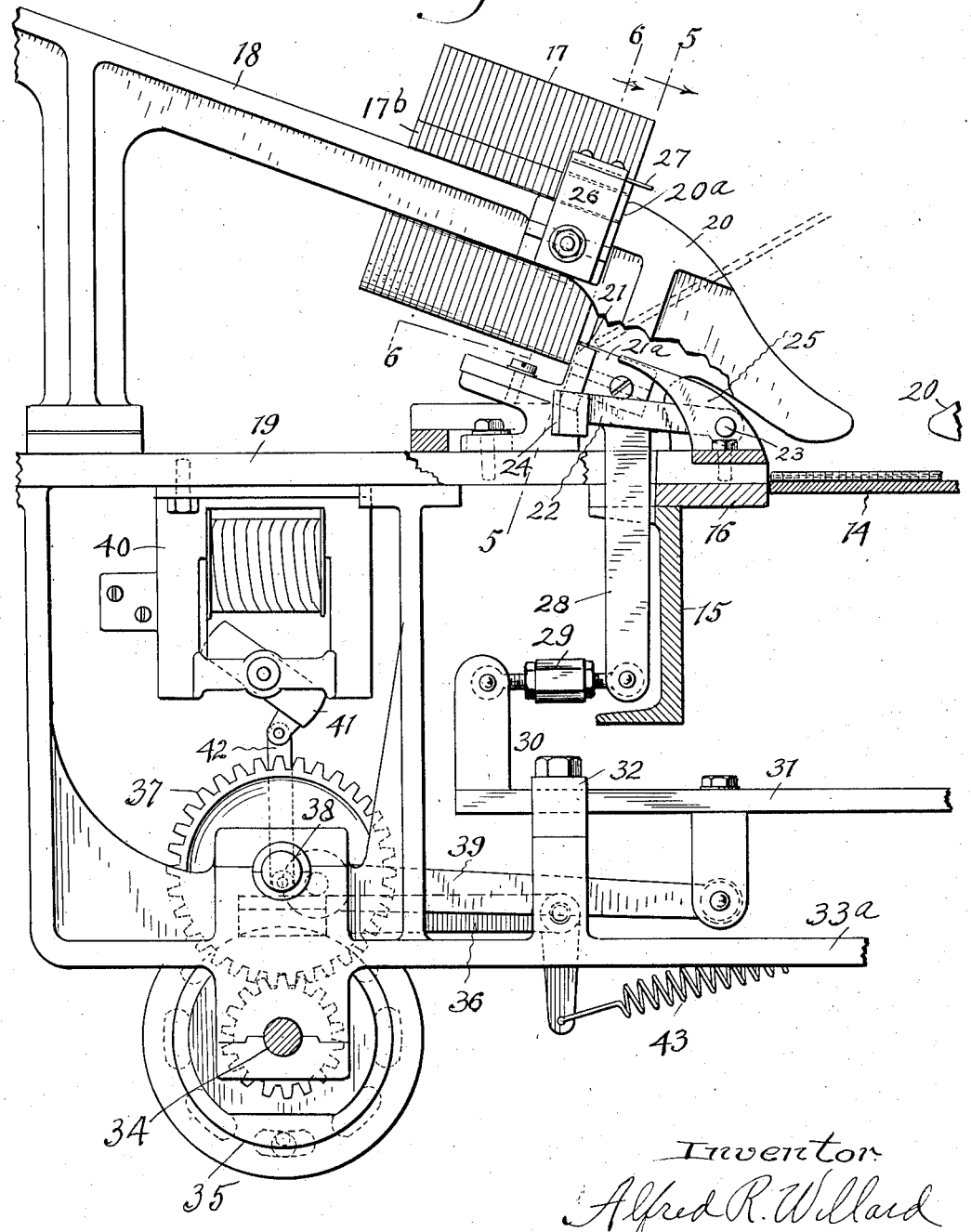

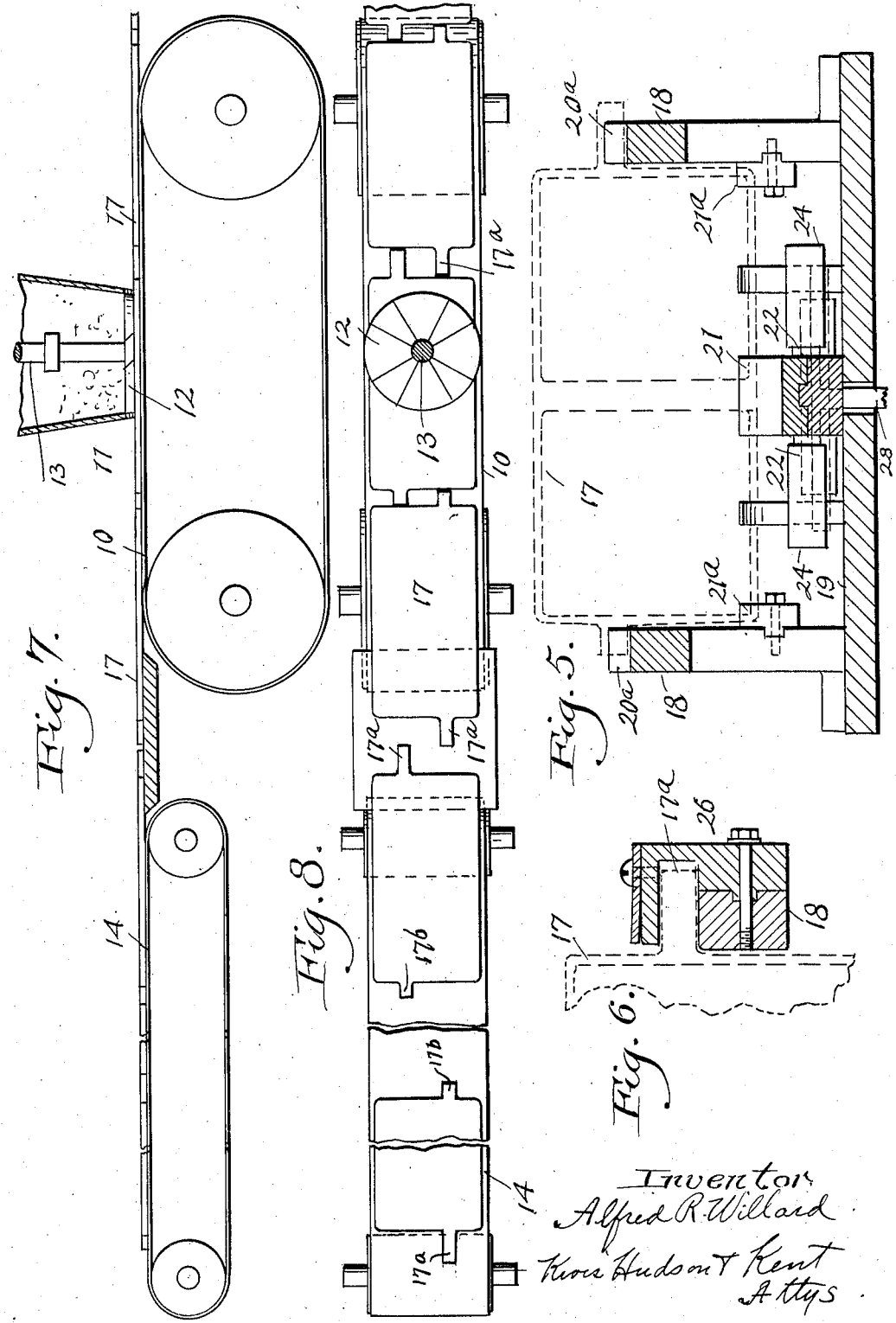

Patented Oct. 23, 1928.

1,688,369

UNITED STATES PATENT OFFICE.

ALFRED R. WILLARD, OF EAST CLEVELAND, OHIO, ASSIGNOR TO WILLARD STORAGE BATTERY CO., OF CLEVELAND, OHIO, A CORPORATION OF WEST VIRGINIA.

AUTOMATIC FEED MECHANISM.

Application filed March 26, 1926. Serial No 97,552.

This invention relates to an automatic feed mechanism particularly for feeding storage battery grids to a machine or device which operates on them, such as a pasting machine for filling the grids with paste which is adapted, by subsequent treatment, to become the active material of either the positive or negative plates.

Storage battery grids are generally cast in pairs which may be termed double or twin grids which after the pasting operation and generally after the charging or forming operation are cut transversely at the center to form the individual plates, the double grids being provided at opposite ends with so-called lugs through which the individual plates of a battery are adapted to be electrically and mechanically fastened together. Generally, in practice, the lug at one end of the double grid is longer than the other; that is to say, it is provided with an extension to facilitate the attachment of a conductor for charging or forming purposes after the pasting operation.

In the method of pasting with which my present feed mechanism has special utility, the double grids are fed end to end in continuous succession by means of a belt or equivalent carrier beneath a paste receptacle in the bottom of which is a rotary wiper which fills the grids by wiping or pressing the paste into the same as the grids move along beneath. The stiffness of the paste, and, therefore, the time required to completely and properly fill a grid depends upon a variety of conditions, particularly the composition of the paste, temperature and humidity, and with the pasting machine which I employ this varies the rate at which the grids pass through the machine.

Inasmuch as the wiper of the pasting machine rotates continuously as the grids are fed beneath it, with this method of pasting, not only are the interstices of the grids filled with paste, but the spaces on the feeding belt between the grids (arranged end to end) are also filled, the lengths of these spaces being determined by the lengths of the lugs on the ends of the grids.

It will be obvious that it is desirable that the spaces between grids, which spaces are filled with paste as above stated, in the aggregate, be as small as possible to avoid wastage of paste and to avoid reducing the capacity of the machine. It is obvious also that if all the grids are fed through the machine from one magazine with the relatively long lugs all facing in one direction (either forwardly or rearwardly) the spaces between the grids will in all cases be at least equal to the combined lengths of both lugs, but if the grids are so fed or supplied to the feed belt that the long lugs face alternately forwardly and rearwardly, the spaces between the grids may be made equal alternately to the length of the long lug and short lug; that is to say, the spaces between the grids may be made alternately long and short instead of all being equal to the combined lengths of the lugs.

The main object of the invention is to provide an automatic feed mechanism which is satisfactory and reliable in operation.

Further and more specific objects are to provide a feed mechanism wherein the grids are supplied to the feeding belt so that the series of grids passing through the machine are alternately spaced apart by a pair of long lugs and then a pair of short lugs so as to provide for maximum capacity and minimum wastage of paste.

Additionally, the invention aims to provide a machine wherein the rate of feed of the grids from the magazines is dependent upon the rate at which the grids are filled by the paste being wiped into the same as they pass beneath the paste receptacle and wiper therein.

The above objects are attained by my invention. which may be briefly summarized as consisting in certain novel combinations and arrangements of parts and details of construction which will be described in the specification and set forth in the appended claims.

In the accompanying sheets of drawings I have illustrated an embodiment of the invention which operates very effectively, and in the drawings Fig. 1 is a side view of my improved feed mechanism; Fig. 2 is an end view of the same with the feed belt frame in section, substantially along the line 2—2 of Fig. 1; Fig. 3 is a top plan view of the same; Fig. 4 is a view partly in end elevation and partly in section showing, on an enlarged scale, part of the mechanism shown in Fig. 2, one of the two magazine racks and associated mechanism being here illustrated; Fig. 5 is a sectional view substantially along the line 5—5 of Fig. 4; Fig. 6 is a sectional view substantially through one rack bar substantially along the line 6—6 of Fig. 4; Figs.

7 and 8 are, respectively, a side elevation and a plan view showing conventionally the feed belt and the belt and some of the other apparatus of the pasting machine, Fig. 8 showing also the arrangement of the double grids as they travel along the belts.

My invention does not reside in the pasting machine per se, but, as previously stated, my feeding mechanism has particular utility when employed in connection therewith. I have, therefore, in Fig. 7 indicated the pasting machine very conventionally, this machine having a belt 10 which is adapted to carry the grids beneath a receptacle 11 containing the paste which is adapted to be wiped into the interstices of the grids by means of a rotary wiper 12 located at the bottom of the receptacle and rotated by a vertical shaft 13 extending down centrally of the receptacle.

In advance of the belt 10 of the pasting machine, I employ a feed belt 14 forming a part of my improved feed mechanism, this belt being preferably operated faster than the belt 10 for a purpose to be explained. The belt 14 as well as the belt 10 may be operated in any suitable manner and the belts may be supported in any suitable way but, in this instance, the belt 14 is shown as mounted in a frame work or table including channel members 15 spaced a suitable distance apart and provided at the top with longitudinally extending bed plates 16 between which the upper reach of the belt 14 operates, as indicated in Figs. 2 and 4. This frame work may extend forwardly to and from a part of the frame of the pasting machine.

In accordance with my invention, the double grids which are designated by the reference character 17, are adapted to be deposited on the belt 14 which conveys them to belt 10, so that they may be fed forwardly end to end in continuous succession as they pass beneath the receptacle 11 and wiper 12. As shown in Fig. 8, the grids 17 as they are fed forwardly are arranged with the long lugs extending alternately forwardly and rearwardly. This brings together alternately the long lugs designated 17ª and the short lugs 17ᵇ so that alternately there is a relatively long space equal to the length of the long lugs and then a relatively short space equal to the length of the short lugs between the grids. Furthermore, it will be noted that the grids 17 are so deposited on the feed belt 14 that the two long lugs or the two short lugs of adjacent grids do not come end to end but are side by side so that the adjacent grids bear against each other at two points; that is to say, each grid bears squarely and solidly on the adjacent grid and there is eliminated all tendency for the grids to be skewed or to turn transversely of the belt. This is of importance in view of the fact that the faster traveling belt 14 has a tendency to push the grids forwardly along the belt 10 to an extent at least to cause them to be in contact as they approach and pass beneath the pasting wheel or wiper. It is important also to the subsequent performance of the machine that an unbroken straight feed of the grids be maintained without a tendency to twist or skew, as would result if the feed depended upon the pushing action of a single lug.

To automatically deposit the grids on the belt 10 so that they will be arranged relatively in the manner described and illustrated, I utilize two feed magazines which are arranged on opposite sides and near the end of the feed belt 14, each magazine consisting of a rack composed of two inclined bars 18 supported on laterally-projecting tables 19. The two pairs of bars 18 are arranged on opposite sides of and somewhat above the feed belt 14 and they incline down toward the latter, as best illustrated in Figs. 2 and 4. At the inner or lower ends of the inclined bars 18 are curved horns 20, the lower ends of which are slightly above the belt 14 and are close to each other, as best illustrated in Fig. 2 and the upper end of each horn terminating in a shoulder 20ª.

On each rack or pair of inclined bars 18 are adapted to be placed stacks of the grids 17 with the lugs resting on or projecting over the top surfaces of the bars 18 and the grids are adapted to slide down the bars 18 until the lugs of the foremost grid engage the shoulders 20ª of the horns 20 and when this takes place the stack is held in inclined position, indicated in Fig. 4 by the shoulders 20ª and by stop members 21 and 21ª adjustably supported on the table 19 and on the magazine rack bars and adapted to engage the lower portion of the foremost grid.

In placing the grids in the two racks on opposite sides of the feed belt, the operator will see to it that the long lugs 17ª of the grids placed in one rack will all face in one direction, for example, forwardly, and those placed in the other rack will project in the opposite direction.

In connection with these feed racks adapted to be supplied with the grids with the lugs resting on top of the rails and with the long and short lugs of the grids on one rack reversely arranged with respect to those in the opposite rack, as described above, I provide mechanism for delivering the grids alternately from opposite racks with the delivery from each rack taking place in the manner such that the foremost grid of the stack is permitted to tip forwardly and slide down the horns 20 and to drop flat onto the belt 14.

To accomplish this result I provide on the table 19 and between the horns 20 of each rack an oscillating lifter 22, mounted upon a pin or shaft 23, and each provided at its free edge with a thin, hardened lifting plate 24 adapted to engage the bottom edge of the foremost grid 17 and to lift it until the lugs clear the shoulders 20ª and until the bottom edge of the grid clears the stops 21. When this occurs, the grid tips forwardly substantially in the manner indicated by the dotted lines of Fig. 4 and then slides down the horns 20 and lands on the traveling belt 14, the lugs which pass down the top edges of the horns 20 sliding underneath the free ends of the horns forming a part of the opposite rack. When the plate tips forwardly, as described, and the lugs slide down the horns 20, the bottom edge of the rack passes over a pair of curved stationary guides 25 which, as best shown in Fig. 3, are arranged on opposite sides of the oscillating lifter 22, these being also supported on the table 19.

On the outer sides of the bars 18 of each magazine rack are adjustably secured a pair of blocks 26, the inner sides of which are slotted to permit the lugs to pass freely along the same but the forward edges or sides of these blocks as so positioned that they will not permit more than a single grid to be elevated and dropped down onto the belt 14. That is to say, they insure the delivery of one grid at a time from the magazine. The upper portions of the blocks have short forwardly projecting springs 27 so arranged that as the foremost grid is elevated by the lifter these springs will be deflected upwardly slightly and assist gravity in causing the lifted grid to tip forwardly in the desired manner.

In order that the grids will be supplied alternately from opposite racks, the lifters 22 are, of course, alternately actuated and preferably they are connected together so as to operate in unison but in opposite directions, one swinging upwardly while the other swings downwardly. To accomplish this the lifters are provided with downwardly extending arms 28 which are connected by adjustable links 29 to upstanding ears 30 of a cross-head 31 mounted in guides 32 to slide transversely beneath the belt frame and tables 19, as best indicated in Figs. 2 and 4, the guides 32 being supported by a frame work 33ª in turn supported on the lower ends of the tables 19.

In operating or moving the cross-head 31 back and forth a continuously rotating shaft 33 is utilized (Fig. 1) which shaft may be driven by any one of the power driven shafts of the machine. This shaft 33 is adapted to actuate intermittently a shaft 34 which in this instance is adapted to be connected to shaft 33 by a clutch 35 which may be of conventional or standard form, commonly used on machines, such as punch presses. Inasmuch as a standard form of clutch is preferably employed it is unnecessary to illustrate the details of it. This clutch is controlled by a pivoted latch 36 which when lifted permits the clutch to engage and then causes the disengagement of the clutch when shaft 34 has made one revolution. This shaft 34 is connected by 2 to 1 speed reduction gearing 37 to a relatively short shaft 38 carrying an adjustable crank pin which is connected by a connecting rod 39 (see particularly Fig. 4) to the cross-head 31.

It will be seen, therefore, that each time the clutch 35 is engaged the crank pin will make one-half a revolution and the cross-head will be given one stroke which will elevate one lifter 22 and lower the other. On the next engagement of the clutch the cross-head will be given a stroke in the opposite direction causing the first mentioned lifter to be lowered and the second mentioned lifter to be elevated.

In accordance with my invention the clutch is controlled automatically and at a frequency depending upon the rate at which the grids are pasted, and to accomplish this I provide in suitable position, preferably on the underside of the table 19 directly above the clutch (as best shown in Figs. 1 and 4), a magnet 40 composed of a core, a coil and a pivoted armature 41 connected by a link 42 to one end of the clutch controlling the latch 36. Normally the magnet 40 is de-energized during which period the latch 36 is held by a spring 43 (Fig. 4) in clutch disengaging position and when the magnet is energized the armature is actuated so as to lift the latch 36 and permit the clutch to be engaged.

The movement of the line of grids along the belts controls the energization of the magnet, and to accomplish this I provide at a suitable point between the feed magazines and the pasting machines a pair of timer contacts 44, preferably arranged in a casing 45 supported on one of the plates 16, one of these contacts being movably mounted on a shaft 47 which projects laterally from the casing as indicated in Fig. 3, over the feed belt and at its free end carries an arm 48 provided with a roller 49 which is adapted to ride over the grids moving along the belt.

This control mechanism is so arranged that as long as the roller 49 engages a grid the contacts remain separated and the magnet is de-energized, but each time the roller drops into the space between any two adjacent grids the contacts are brought into engagement and cause the energization of the magnet. Immediately after the magnet is energized, it is de-energized by the next grid lifting the roller resulting in the disengagement of the clutch, as already explained, this occurring after the cross-head has made a complete stroke in one direction.

The operation is as follows: Assuming that the machine is in operation, the grids pass along the belt of the pasting machine at a rate which is just sufficient to cause the grids to be properly pasted. Up to a point where the grids are filled with paste, there is no positive connection between the grids and belt so that the grids while being pasted are not required to move at the speed of the belt and there is a constant slippage of the grids on the pasting belt, the feed being slowed up while the grid is under the pasting wheel. Due to the fact that the feed belt has a higher speed than that of the pasting belt, the close arrangement of the grids immediately in front of and while in pasting position is insured, the spacing of the grids being at no time greater than the length of the lugs.

Whenever the roller 49 drops into a space between a pair of grids the clutch is engaged causing a grid to be released from one magazine and to drop onto the belt 14, the grids being supplied alternately from the two magazines for the purpose already explained. As a grid drops onto the feed belt it is moved forwardly beneath one or more hold down members 50 toward the line of grids and as the belt 14 moves more rapidly than belt 10 it is carried forwardly until it engages the rearmost of the line of grids lying on the belts 10 and 14, and when it engages the rearmost grid of the line the belt 14 will slip under it and it will be in proper relation to the grid immediately in advance of it when the forward end reaches a point so that the roller 49 may drop into the space between it and the grid immediately preceding.

In this way the rate of feed depends upon the rate at which the grids pass through the pasting machine; there is a solid line of grids which are so arranged as to avoid losing any more paste than necessary; jamming of the grids is avoided since the grids are fed no faster than required by the rate of movement through the pasting machine; and by controlling the rate of feed of the grids through the medium of the timing contact I may feed grids of different lengths without necessity of making any change other than whatever adjustments may be necessary in the magazine racks to accommodate the different sized grids.

While I have shown the preferred construction, I do not desire to be confined to the precise details or arrangements shown but aim in my claims to cover all modifications which do not involve a departure from the spirit and scope of my invention as defined in the appended claims.

Having thus described my invention, I claim:

1. In a feed mechanism for supplying grids and the like to a machine or device for operating thereon, a conveyor for the grids, two feed magazines, and means for supplying the grids alternately from the two magazines.

2. In a feed mechanism for supplying grids and the like to a machine for operating thereon, a conveyor, two grid magazines arranged on opposite sides of the conveyor, and means for supplying the grids alternately from opposite magazines.

3. A feed mechanism for feeding storage battery grids to a machine for operating thereon, comprising a conveyor, and means for supplying the grids to the conveyor alternately from the opposite sides thereof.

4. In a machine for feeding to an operating machine storage battery grids having lugs of different lengths at their ends, a conveyor, and means for supplying the grids to the conveyor so that the relatively long lugs face alternately forwardly and rearwardly.

5. A mechanism for feeding to an operating machine storage battery grids having lugs of different lengths at their ends, comprising a conveyor, and means for supplying the grids to the conveyor so that the grids may be spaced apart alternately by two long lugs and then by two short lugs.

6. In a mechanism for feeding storage battery grids, storage means for a quantity of grids, a belt, means for causing the grids to be delivered onto the belt one at a time, and means controlled by the rate of movement of the grids along the belt for timing the operation of the delivery means.

7. In a feed mechanism for supplying storage battery grids to an operating machine, a belt, a pair of grid magazines, means for delivering the grids alternately from the magazines, and means controlled by the rate of movement of the grids along the belt for timing the operation of the delivery means.

8. In a feed mechanism for storage battery grids having lugs at opposite ends thereof, a magazine comprising a rack on which said grids are supported by said lugs, a belt adjacent thereto, means for holding a quantity of grids in inclined position on the rack, and means for causing the delivery of the foremost grid from the rack to the belt.

9. In a feed mechanism for storage battery grids having lugs at opposite ends thereof, a belt, a magazine comprising rack bars inclining downward toward the belt, means for holding a quantity of grids on said rack bars with the lugs engaging the same, and means for causing the delivery of the lowermost grid from the magazine to the belt.

10. A feed mechanism for storage battery grids having lugs at opposite ends thereof, comprising a rack composed of two bars adapted to be engaged by the lugs so that the body portions of the grids may extend down between the bars, stop members substantially in line with the bars and adapted to be engaged by the lugs of the foremost grid, and means for elevating the foremost grid so that the lugs may clear said stop members.

11. A feed mechanism for storage battery grids having lugs at opposite ends thereof, comprising a rack having two spaced bars on which the lugs of the grids may engage, stop members substantially in line with the bars and adapted to be engaged by the lugs of the foremost grid, stop members adapted to be engaged by the lower portion of the foremost grid, and means for lifting the foremost grid so that it may clear said stop members.

12. A feed mechanism for storage battery grids, comprising a belt, a pair of magazines on opposite sides thereof, each comprising a rack adapted to hold a quantity of grids, a delivery member for each rack, a common actuating member for the delivery members, and means for shifting the same so that grids are delivered alternately from the two racks.

13. A feed mechanism comprising a belt, a pair of magazine racks on opposite sides thereof, delivery members comprising a pair of lifters adapted to engage and lift the foremost grid of each rack, and an actuating member connected to both lifters so as to simultaneously move one upward and the other downward.

14. In combination with a machine having a belt for feeding storage battery grids, a feed mechanism comprising a belt adapted to deliver grids in end to end engagement to the first mentioned belt and traveling faster than the latter, said grids being disposed in substantially the same plane, and means for delivering the grids to the second mentioned belt.

15. In combination with a machine having a belt for carrying grids therethrough, a feed mechanism comprising a belt traveling faster than the first mentioned belt, and means automatically controlled by the rate of movement of the grids along one of the belts for delivering grids to the second mentioned belt.

16. In combination with a machine having a belt for carrying storage battery grids therethrough, a feed mechanism comprising a belt traveling faster than the first mentioned belt and adapted to deliver grids to the latter, a magazine, delivery means for causing grids to be delivered from the magazine to the second mentioned belt, and means controlled by the grids as they pass along one of the belts for timing the operation of the delivery means.

17. A feed mechanism for storage battery grids having lugs at opposite ends thereof comprising means for supporting said grids by their lugs, means for maintaining said grids in stacked position upon said supporting means, and means for causing the foremost grid to be removed from said supporting means.

18. A feed mechanism for storage battery grids having lugs at opposite ends thereof comprising means for supporting said grids by their lugs so that they will be fed by gravity toward one end thereof, means for maintaining said grids in stacked position, and means for removing only the foremost grid from the supporting means.

19. A feed mechanism for storage battery grids having lugs at opposite ends thereof comprising means for supporting said grids by their lugs, means for maintaining said grids in stacked relation, and automatic means for removing the foremost grid from said supporting means.

In testimony whereof, I hereunto affix my signature.

ALFRED R. WILLARD.